(12) United States Patent
Uavechanichkul et al.

(10) Patent No.: US 11,490,036 B1
(45) Date of Patent: Nov. 1, 2022

(54) SHARING VIDEOS HAVING DYNAMIC OVERLAYS

(71) Applicant: Meta Platforms, Inc., Menlo Park, CA (US)

(72) Inventors: Jaed Uavechanichkul, San Francisco, CA (US); Haixia Shi, Sunnyvale, CA (US); Christopher Ellsworth, San Francisco, CA (US); Martin Mroz, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/021,741

(22) Filed: Sep. 15, 2020

(51) Int. Cl.
| | |
|---|---|
| H04N 5/272 | (2006.01) |
| H04N 19/46 | (2014.01) |
| G06F 3/0484 | (2022.01) |
| H04N 7/025 | (2006.01) |
| G06T 11/40 | (2006.01) |
| H04N 7/08 | (2006.01) |
| G06T 11/60 | (2006.01) |
| G06F 17/00 | (2019.01) |

(52) U.S. Cl.
CPC .......... *H04N 5/272* (2013.01); *G06F 3/0484* (2013.01); *G06T 11/40* (2013.01); *G06T 11/60* (2013.01); *H04N 7/025* (2013.01); *H04N 7/08* (2013.01); *H04N 19/46* (2014.11); *G06T 2200/24* (2013.01); *G06T 2210/62* (2013.01)

(58) Field of Classification Search
CPC .......... H04N 5/272; H04N 7/08; H04N 7/025; H04N 19/46; G06F 3/0484; G06T 11/40; G06T 11/60; G06T 2210/62; G06T 2200/24
See application file for complete search history.

(56) References Cited

U.S. PATENT DOCUMENTS

| | | | |
|---|---|---|---|
| 10,028,022 B1 * | 7/2018 | Pique Corchs | H04N 21/44209 |
| 2016/0071544 A1 * | 3/2016 | Waterston | G11B 27/031 |
| | | | 386/278 |
| 2016/0198097 A1 * | 7/2016 | Yewdall | H04N 5/272 |
| | | | 348/659 |
| 2018/0191797 A1 * | 7/2018 | Javier | G06F 40/174 |
| 2020/0007883 A1 * | 1/2020 | Toresson | H04N 19/176 |

* cited by examiner

*Primary Examiner* — Quoc A Tran
(74) *Attorney, Agent, or Firm* — Lee & Hayes, P.C.

(57) ABSTRACT

Techniques are described that enable a user to share videos having dynamic overlays on a social networking system. In some examples, a server computing device may receive, at a first time from a first client device, a first video. For instance, the server computing device may begin receiving the first video after the first client device has concluded capturing the first video, but has not yet completed customizing the first video. The server computing device may receive, at a second time after the first time and from the first client device, a dynamic overlay including customizations to be applied to the first video. The dynamic overlay may be transmitted separately from the first video. In examples, the server computing device generates a second video by applying the dynamic overlay to the first video. The server computing device then provides the second video to a second client device.

20 Claims, 6 Drawing Sheets

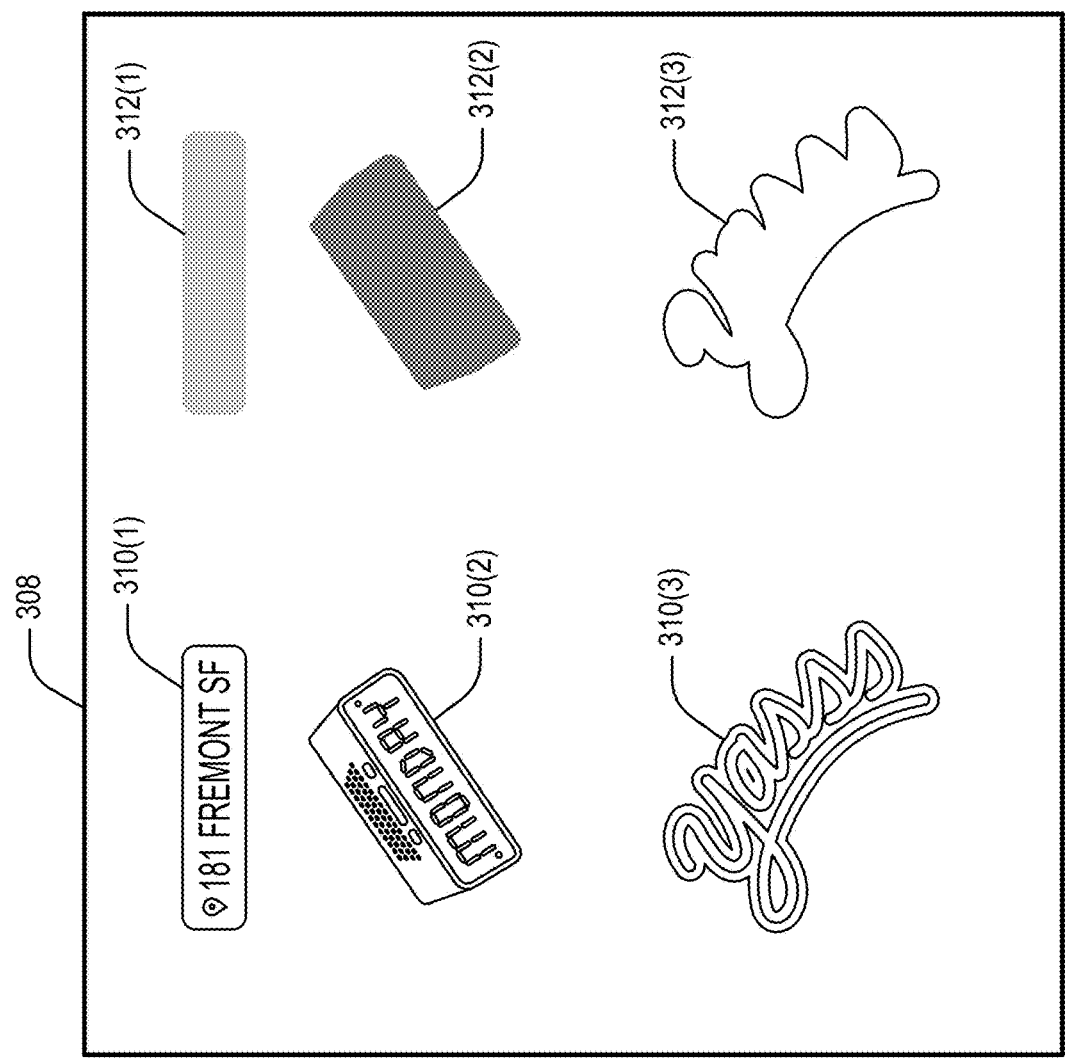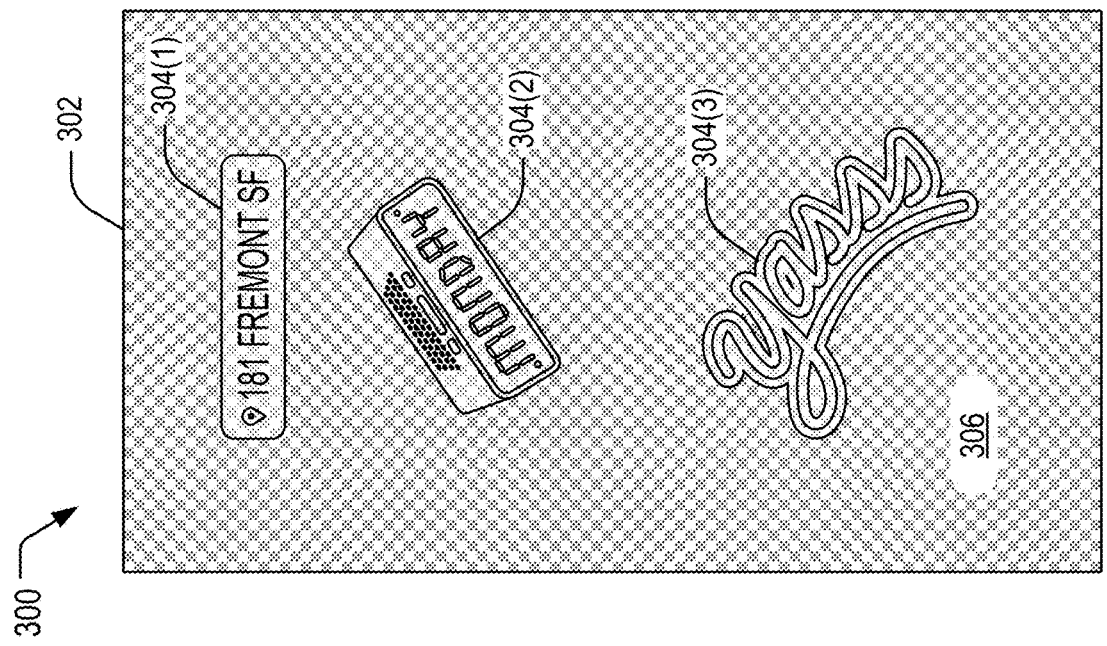
FIG. 3

400

RECEIVE, BY A SERVER COMPUTING DEVICE AT A FIRST TIME FROM A
FIRST CLIENT DEVICE, A FIRST VIDEO
402

RECEIVE, BY THE SERVER COMPUTING DEVICE AT A SECOND TIME
AFTER THE FIRST TIME AND FROM THE FIRST CLIENT DEVICE, A
CUSTOMIZATION TO BE APPLIED TO THE FIRST VIDEO
404

GENERATE, BY THE SERVER COMPUTING DEVICE, A SECOND VIDEO BY
APPLYING THE CUSTOMIZATION TO THE FIRST VIDEO
406

PROVIDE, BY THE SERVER COMPUTING DEVICE, THE SECOND VIDEO
TO A SECOND CLIENT DEVICE
408

FIG. 4

SHARING VIDEOS HAVING DYNAMIC OVERLAYS

BACKGROUND

Social networking systems allow users to connect with each other by, for example, sharing content such as photos, audio, and/or videos with one another. Some social networking systems allow users to customize content before sharing the content with other users on the social networking system, such as by adding filters, stickers, text overlays, graphics interchange format files (GIFs), and the like. Sharing content, including customized content, on conventional systems is not without limitations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 depicts example frames of dynamic overlays that may be generated by a client computing device and/or transmitted from a client computing device to a social networking computing device to be combined with a video using the techniques described herein.

FIG. 4 illustrates a flowchart outlining an example method to generate and share a video having a dynamic overlay using the techniques described herein.

DETAILED DESCRIPTION

Figure 1:
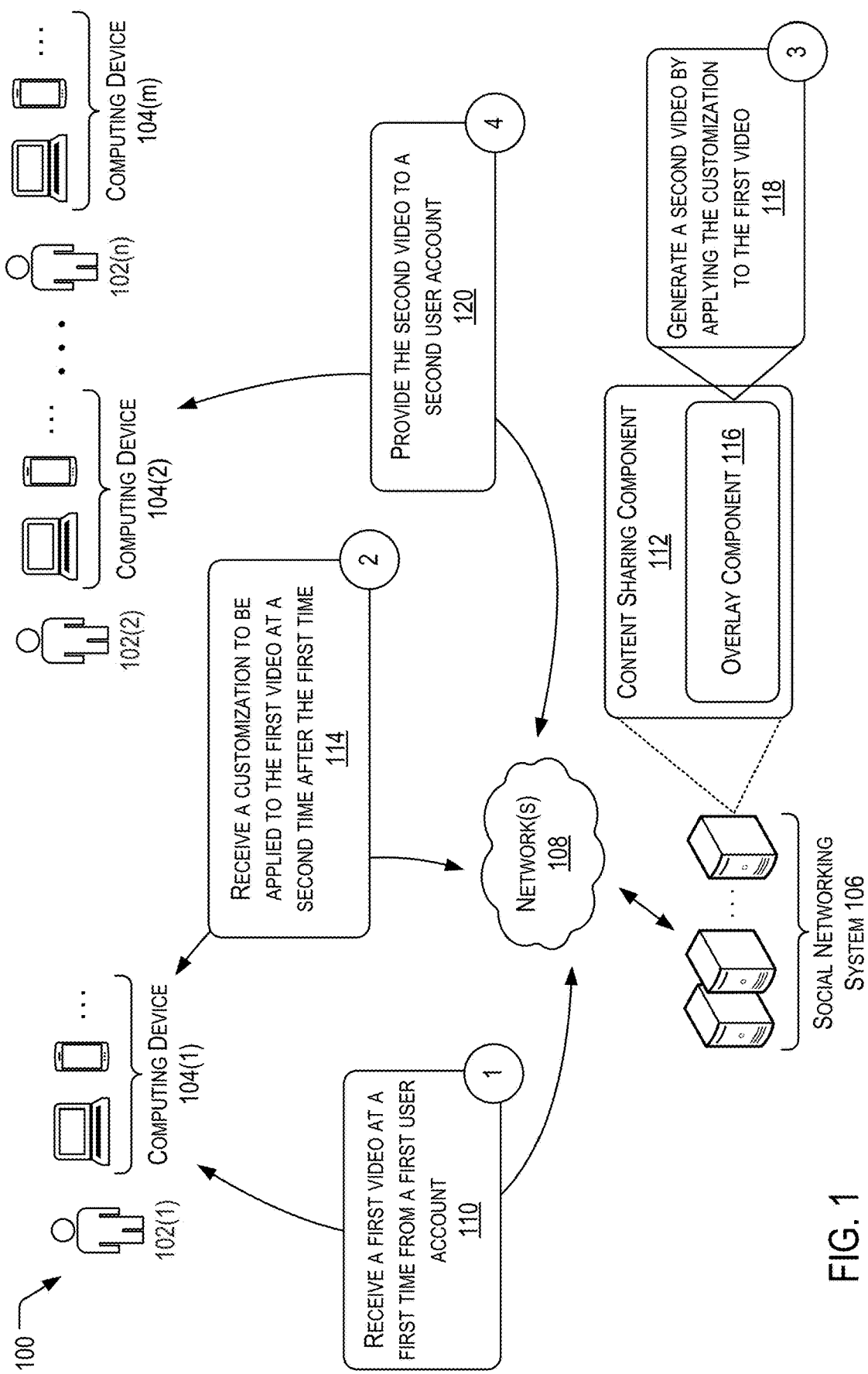
FIG. 1 is a schematic view of an example system usable to implement example techniques for sharing videos having dynamic overlays as described herein.

As discussed above, social networking systems allow users to connect with each other by, for example, sharing content such as photos, audio, and videos with one another. In some cases, a social networking system may give users the ability to customize content, such as videos, before sharing the content with other users on the social networking system by adding filters, stickers, text overlays, graphics interchange format files (GIFs), and the like. In conventional systems, a user captures a video (or retrieves a video from storage), then applies customizations using an application at a client computing device. The user may then determine that the customized video is ready to share on the social networking system, and submit a request to share the customized video with one or more other users on the social networking system.

Conventional systems then transmit the customized video, including the customizations, from the client computing device to the social networking system, which in turn transmits the customized video to the other user(s) designated in the request. There is often a noticeable delay using these conventional systems between a time when the user submits the request to share the customized video, and when the designated other users receive the customized video. Much of this delay is attributable to the transmission time for the customized video from the client computing device to the social networking system over a network. Users desire to see this delay reduced as much as possible when sharing content with other users on a social networking system. For example, when a user experiences a delay due to transmission time of the video from the client computing device to the social networking system, the user may become confused about whether the video has been transmitted or not, and retry to share the video.

This application describes techniques for sharing customized videos having via a social networking system and/or service (herein referred to as a "social networking system"). Various embodiments of the present disclosure include systems, methods, and non-transitory computer-readable media of a social networking system.

For instance, a social networking system may operate a service that corresponds to a dedicated application installed on a user device. The social networking system may enable users to share content via the application installed on the user device. In some cases, the shared content may be accessed (e.g., viewed) by devices associated with other users that also have the application installed on their respective devices. Alternatively or additionally, the social networking system may enable users to share content, and/or access (e.g., view) content shared by other user accounts, via a web-based application accessed via a web browser. The social networking system may store account information associated with each user and the respective device on which the application is installed and/or via which the social networking system is accessed.

In some examples, a server computing device of the social networking system may receive, at a first time from a first client device, a first video. For instance, the server computing device may begin receiving the first video after the first client device has concluded capturing the first video, but before the user of the first client device has completed customizing the first video with filters, stickers, text overlays, graphics interchange format files (GIFs), and so forth. The server computing device may receive, at a second time after the first time and from the first client device, a dynamic overlay to be applied to the first video. The dynamic overlay may include customizations that a user desires to apply to the first video to share with other users on the social networking system. In some cases, the dynamic overlay is transmitted separately from the first video, and in response to an indication from the user that the customization of the first video is complete. In examples, the server computing device generates a second video by applying the dynamic overlay to the first video. The server computing device then provides the second video to a second client device, where the second client device may be associated with a user account with which the user wants to share the customized video.

In some examples, the dynamic overlay comprises one or more of an animated object, a moving object, or a filter that alters a characteristic of the first video. In some cases, the dynamic overlay may also include static objects, such as text, an image, or a sticker, along with dynamic components included in the dynamic overlay.

In some examples, the dynamic overlay is at least partially transparent, such that when the dynamic overlay is applied to a frame of the first video, at least a portion of the frame of the first video is visible.

In some examples, the first video includes a first identification tag and the dynamic overlay includes a second identification tag that matches the first identification tag. For instance, the first identification tag and the second identification tag may be included as metadata with the first video and the dynamic overlay, respectively. In examples, generating the second video is responsive to receiving the second identification tag with the dynamic overlay and determining that the second identification tag matches the first identification tag included in the first video. In this way, the server computing device may match the dynamic overlay with the correct video, even when the dynamic overlay is received at a different time than the first video.

In some examples, the dynamic overlay may be received in an advanced video coding (AVC) compression standard format, such as an H.264 or MPEG-4 part 10, to name a few examples. The server computing device may decode the dynamic overlay from the AVC compression standard format, and apply the dynamic overlay as decoded to the first video when generating the second video. By using an AVC compression standard format to transmit the dynamic overlay, the video quality of the dynamic overlay is preserved while minimizing the bit rate during the transfer of the dynamic overlay.

In some examples, generating the second video comprises applying an FFmpeg filter to combine the dynamic overlay with the first video. Using an FFmpeg filter may allow the server computing device to combine the first video with the dynamic overlay, even when the first video and the dynamic overlay are transmitted to the server computing device in different formats.

In some examples, a client computing device receives a video at a first time, and begins transmitting the video to a social networking computing device (e.g., a server of a social networking system). The client computing device may then receive a first user input to customize the video (e.g., by application of a dynamic overlay), and a second user input to share the customized video (e.g., with the dynamic overlay applied to the video) on a social networking system. The client computing device may then transmit, in response to the second user input, the dynamic overlay or an indication of one or more components included in the dynamic overlay to the social networking computing device. For instance, the client computing device may transmit the dynamic overlay and/or the indication of the one or more components included in the dynamic overlay while the video is still being transmitted to the social networking computing device, and/or after the video has completed transmission to the social networking computing device.

In some examples, transmitting by the client computing device comprises transmitting the dynamic overlay. The dynamic overlay may comprise one or more of an animated object, a moving object, or a filter that alters a characteristic of the first video. As described above, the dynamic overlay may also include static objects, such as text or a sticker, along with dynamic components included in the dynamic overlay. Transmitting the dynamic overlay may reduce processing resources at the server computing device by not requiring that the server store a large number of components that may be included in dynamic overlays.

In some examples, transmitting by the client device comprises transmitting the indication of the one or more components included in the dynamic overlay. The indication may comprise an address of the one or more components stored at the social networking computing device. Transmitting the indication of the one or more components included in the dynamic overlay (e.g., rather than transmitting the dynamic overlay itself) may reduce the amount of data sent over a network and reduce transmission time from the client computing device to the social networking computing device.

In some examples, the client computing device rasterizes the one or more components included in the dynamic overlay to a red green blue alpha (RGBA) bitmap. The client computing device may separate the RGBA bitmap into at least a color channel (e.g., the red, green, and blue components of the bitmap) and an alpha channel comprising the alpha components of the bitmap. The client computing device may convert the color channel and the alpha channel into luma components (Y) and chrominance components of a blue projection (U) and a red projection (V), forming a YUV frame. In examples, the client computing device generates a dynamic overlay video file that includes at least the YUV frame, and when transmitting the dynamic overlay, the client computing device transmits the dynamic overlay video file. By using a YUV frame to transmit the dynamic overlay as a dynamic overlay video file, the client computing device reduces the bandwidth required for chrominance components of the dynamic overlay to be transmitted. Additionally, the YUV frame allows the social networking computing device and/or another client computing device that receives the customized video to more efficiently mask transmission errors or compression artifacts by human perception than using a "direct" RGB-representation of the customized video.

In this way, the social networking system provides users with the ability to share customized videos, such as videos having dynamic overlays, more efficiently than conventional techniques that transmitted both a video and a dynamic overlay once the user finished customizing the video. For instance, the described techniques begin transmitting the video earlier (e.g., upon completion of capturing the video) than conventional techniques that waited until customizations were complete to begin transmission. By transmitting the video while the user is making customizations and compiling the dynamic overlay to be applied to the video, the amount of time between the user selecting a control to share the video and the video reaching its destination is significantly reduced. Additionally, user confusion about whether a video has successfully transmitted may also be resolved by receiving confirmation of transmission sooner than conventional techniques, thus reducing network traffic by eliminating upload retries caused by users thinking the original transmission failed.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to facilitate social network collections on an application via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. The computing devices 104 may be client computing devices, and in some cases these terms may be used interchangeably. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) and/or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices (e.g., a social networking computing device), any or all of which may include one or more processors and memory storing computer executable instructions that when executed cause the computing device(s) to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, financial information and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to facilitate sharing videos having dynamic overlays between the users 102 via the computing devices 104.

For example, at operation 110 (indicated by "1"), a content sharing component 112 of the social networking system 106 may receive a first video at a first time from a first user account. In some examples, the content sharing component 112 may be part of a social network service (e.g., Threads®, Facebook®, Instagram®, Snapchat®, etc.), although other examples of services are also considered. The first user account may be a user account created by the user 102(1) to access a social networking service via the computing device 104(1). In many of the examples described herein, the user 102(1) captures the first video using a camera of the computing device 104(1). However, other examples are also considered for obtaining video(s), such as retrieving a video from a different computing device or storage (e.g., cloud storage), generating an animation to be used for the video, capturing an image using a camera of the computing device 104(1) in place of the video, capturing video using a phone or video conferencing application, and the like.

In some cases, the computing device 104(1) begins transmitting the first video to the content sharing component 112 prior to and/or while the user 102(1) is applying one or more customizations to the first video. For example, the user 102(1) may capture the first video using a social network application installed on the computing device 104(1), where the social network application accesses a camera of the computing device 104(1). The computing device 104(1) may, in some examples, begin transmitting the first video to the content sharing component 112 upon cessation of the video capture using the social network application by the user 102(1). The user 102(1) may then begin applying one or more customizations to the first video via the social network application on the computing device 104(1), such as filters, stickers, text overlays, graphics interchange format files (GIFs), and so forth while the computing device 104(1) transmits the first video to the content sharing component 112. Examples are also considered in which the computing device 104(1) begins transmitting the first video prior to cessation of the video capture of the first video as well. Additionally, in some examples, the computing device 104(1) begins transmitting the first video to the content sharing component 112 upon selection of a previously recorded video from a storage location, such as a storage location on the computing device 104(1), a cloud storage location, and so forth.

At operation 114 (indicated by "2"), an overlay component 116 of the content sharing component 112 receives a customization, such as a dynamic overlay, from the computing device 104(1) to be applied to the first video at a second time after the first time. As discussed above, a dynamic overlay may include customizations that the user 102(1) desires to apply to the first video to share with other users 102(2)-102(n) on the social networking system 106. The customizations may include one or more filters that may impart an aesthetic on the video by varying characteristics such as saturation, brightness, contrast, sharpening, softening, and so forth by a predetermined amount. Alternatively or additionally, a filter may include an augmented reality effect that enhances one or more objects depicted in the video using computer-generated perceptual information. In some examples, the customizations may include one or more animated objects (e.g., animated GIFs), moving objects, stickers, or text overlays, to name a few examples.

The computing device 104(1) may generate a dynamic overlay video file to transmit to the overlay component 116 that includes the components indicated by the user 102(1) to be included in the dynamic overlay. The dynamic overlay video file may have a different frame rate than the frame rate of the first video. For instance, the dynamic overlay video file may have a lower frame rate than the first video when the dynamic overlay includes less detailed components than the first video, when network conditions call for less data to be sent over the network, and so forth.

In some examples, the dynamic overlay video file may be a recording of how the components overlay the first video, rather than the components themselves being transmitted. As an illustrative example, the computing device 104(1) may transmit the dynamic overlay video file that depicts a recording of two animated GIFs that the user 102(1) has selected to overlay the first video, rather than transmitting the animated GIFs themselves. In many cases, a dynamic overlay video file may comprise less data than animated components, such as GIF files or animated .png files. Thus, by using a dynamic overlay video file, less data is transmitted over the network 108. In some cases, the computing device 104(1) encodes the dynamic overlay video file in an advanced video coding (AVC) compression standard format prior to transmitting the first video to the overlay component 116. Additional details regarding generating a dynamic overlay video file are discussed in relation to FIG. 3.

In addition to or alternatively from transmitting a dynamic overlay video file, in some cases, the computing device 104(1) may transmit an indication of one or more components to be included in the dynamic overlay to the overlay component 116. For example, the social networking system 106 may store components that the user 102(1) can select from to be included in a dynamic overlay. Therefore, the indication transmitted by the computing device 104(1) may include an address of a storage location at the social networking system 106 of the one or more components to be included in the dynamic overlay. In some examples, the indication may also include information such as a location that a component is to be displayed overlaying the first video, a size that a component is to be displayed overlaying the first video, a timing at which the overlay is to be displayed overlaying the first video, and the like. Transmitting an indication of one or more components to be included in a dynamic overlay may reduce an amount of data sent over the network 108 when sharing videos having dynamic overlays, rather than transmitting the components themselves.

In some cases, the computing device 104(1) transmits the dynamic overlay in response to an indication from the user 102(1) that the customization of the first video is complete. For instance, the computing device 104(1) transmits the dynamic overlay in response to selection of a control in a user interface displayed on the device to "Share" and/or "Send" the first video as customized. As noted above, the first video may already have been transmitted from the computing device 104(1) to the content sharing component 112 (or, at least begun transmission). Therefore, the computing device 104(1) transmits the dynamic overlay to the overlay component 116 separately from the first video.

At operation 118 (indicated by "3"), the overlay component 116 generates a second video by applying the customization, such as the dynamic overlay, to the first video. As mentioned above, the computing device 104(1) may transmit the first video and the dynamic overlay separately, at different times from one another, to the content sharing component 112. To ensure that the correct dynamic overlay is applied to the appropriate video, the first video may include a first identification tag (e.g., included in video metadata) and the dynamic overlay may also include a second identification tag (e.g., also included in metadata) that matches or is otherwise associated with the first identification tag. The overlay component 116 may determine that the first identification tag included with the first video matches the second identification tag included in the dynamic overlay prior to generating the second video. Identification tags may be used for indications of components included in a dynamic overlay as well (e.g., when an indication of components is sent alternatively or in addition to a dynamic overlay video file) to match such indications to the correct first video.

As noted above, the computing device 104(1) may encode the dynamic overlay video file in an AVC compression standard format prior to transmitting the dynamic overlay video file to the overlay component 116. In examples, the overlay component 116 decodes the dynamic overlay from the AVC compression standard format, and applies the decoded dynamic overlay to the first video to generate the second video. An AVC compression standard format, such as H.264, allows the dynamic overlay to be provided at a lower bit rate than transmitting the first video with customizations included as in conventional techniques. Thus, the amount of data sent over the network 108 is receded, along with reduced processing resources of the social networking system 106 and/or the computing devices 104(2)-104(n) with which the second video is shared.

In some examples, the overlay component 116 combines the dynamic overlay with the first video using an FFmpeg filter. Generally, an FFmpeg filter enables transcoding of common and uncommon media files into a common format. Therefore, the overlay component 116 may use an FFmpeg filter to combine the first video with the dynamic overlay, even when the first video and the dynamic overlay are transmitted to the content sharing component 112 in different formats and/or having different frame rates. For instance, the overlay component 116 may use an FFmpeg "alphamerge" filter to combine color and opacity information in the dynamic overlay. Alternatively or additionally, the overlay component 116 may use an FFmpeg "overlay" filter to combine the dynamic overlay with the first video. Other examples of FFmpeg filters are also considered.

At operation 120 (indicated by "4"), the content sharing component 112 provides the second video having the dynamic overlay incorporated to a second user account of the social networking system 106. For example, the content sharing component 112 may deliver the second video to an inbox of the second user account associated with the user 102(2) as a direct message from the first user account of the user 102(1). In some cases, the content sharing component 112 may deliver the second video to inboxes of user accounts associated with multiple other users 102(2)-102(n) as direct messages. Alternatively or additionally, the content sharing component 112 may provide the second video to the other users 102(2)-102(n) as feed media, such that the content item appears in a feed of content posts that the other users 102(2)-102(n) follow on the social networking system 106. Further, in some cases, the content sharing component 112 may provide the second video to the other users 102(2)-102(n) as an ephemeral content item that is viewable for a limited duration.

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) ... 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2:
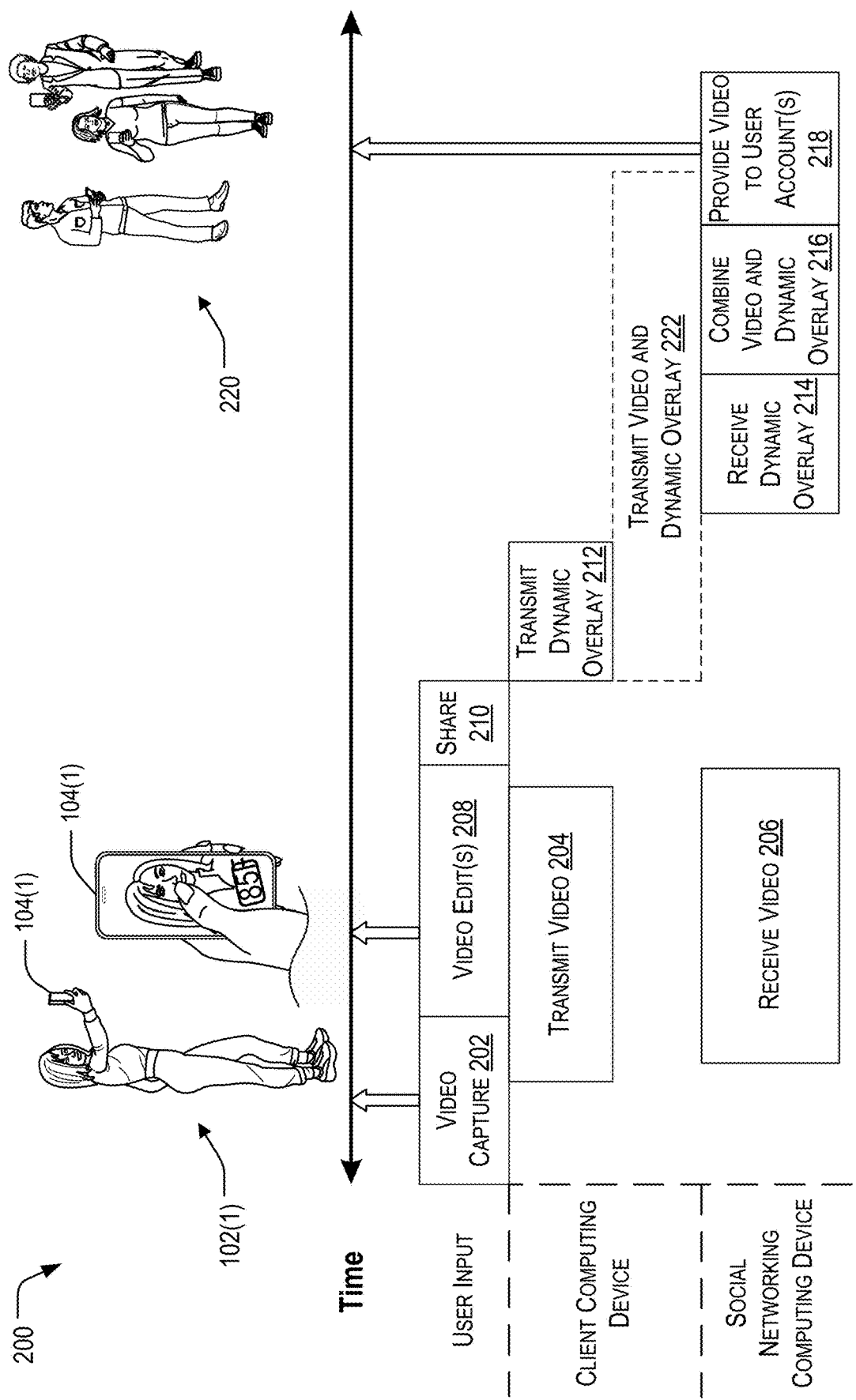
FIG. 2 depicts an example timeline for sharing a video having a dynamic overlay using the techniques described herein.

FIG. 2 depicts an example timeline 200 for sharing a video having a dynamic overlay using the techniques described herein. The example timeline 200 includes actions which may be executed as user inputs for creating and/or sharing a video having a dynamic overlay, actions which may be executed by a client computing device (e.g., the computing device 104(1) described above) for creating and/or sharing a video having a dynamic overlay, and actions which may be executed by a social networking computing device (e.g., a server computing device of the social networking system 106 described above).

In some examples, the creation and sharing of a video having a dynamic overlay begins with a user input to initiate video capture at an operation 202. For example, the user 102(1) described in relation to FIG. 1 is shown with the computing device 104(1). In some cases, the user 102(1) may initiate video capture with the computing device 104(1) using a social network application installed on the computing device 104(1) that controls a camera of the computing device. After the user 102(1) begins capturing the video, the client computing device may begin transmitting, at an operation 204, the video to the social networking computing device. As shown, the operation 204 may begin at a time after the operation 202. For example, the client computing device may begin transmitting the video after the user 102(1) has concluded capture of the video, although examples are also considered in which the client computing device transmits the video while the user 102(1) is still in the process of capturing the video. In examples, the social networking computing device receives the video from the client computing device at an operation 206. A slight delay is shown between the operation 204 and the operation 206, to account for transmission time between the computing devices.

The user 102(1) may conclude capturing the video, and may then begin editing the video at an operation 208 via one or more user inputs. In some examples, the user 102(1) may edit the video to include a dynamic overlay having one or more customizations such as an animated object, a moving object, and/or a filter, as described herein. As shown, the client computing device may transmit the video to the social networking computing device while the user 102(1) is making the edits to customize the video. Therefore, the client computing device may transmit the video without the edits to the social networking computing device, and the social networking computing device receives the video unedited while the user applies edits to the video on the client computing device.

In examples, the user 102(1) may provide a user input to share the video on the social networking system at an operation 210. The user input to share the video may indicate a conclusion of the video edits in the operation 208. Responsive to receiving the user input to share the video, the client computing device may transmit the dynamic overlay at an operation 212 to the social networking computing device. Although shown as having some time in between the operation 204 and the operation 212, examples are considered in which the video has not finished transmitting before the user input to share at the operation 210. Therefore, in some cases, the client computing device may transmit the video and the dynamic overlay in parallel to the social networking computing device. The social networking computing device receives the dynamic overlay from the client computing device at an operation 214.

In some examples, the social networking computing device combines the video and the dynamic overlay at an operation 216, such as after both the video and the dynamic overlay have been received. Combining the dynamic overlay may include matching an identification tag included with the video to an identification tag included with the dynamic overlay. In some cases, the social networking computing device may decode the dynamic overlay from an AVC compression standard format, such as when the dynamic overlay is transmitted as an encoded dynamic overlay video file. Alternatively or additionally, the social networking computing device may receive an indication of one or more components included in the dynamic overlay as indicated in the operation 208. The social networking computing device may use an address included in the indication to retrieve the associated component in storage, and combine the component with the video as directed in the indication. The social networking computing device may then, at an operation 218, provide the video with the dynamic overlay applied to one or more devices associated with other users 220 on the social networking system 106.

Additionally, the example timeline 200 includes an operation 222, which illustrates at least partially how conventional systems transmit customized videos (indicated by a dashed line). In many cases, conventional systems transmit the video and the dynamic overlay together as a single file in the operation 222, after the user input to share indicated by the operation 210. Accordingly, in conventional systems, a noticeable transmission delay is present between the operation 210 to share the customized video and the video being provided to the other users 220. The techniques described herein mitigate this transmission delay by transmitting the video in the operation 204 earlier than conventional techniques as illustrated in the operation 222.

FIG. 3 depicts example frames 300 of dynamic overlays that may be generated by a client computing device and/or transmitted from a client computing device to a social networking computing device to be combined with a video using the techniques described herein. In some examples, as described above, the computing device 104(1) (e.g., a client computing device) converts video customizations applied by the user 102(1) to a separate dynamic overlay video file. The computing device 104(1) may then transmit the dynamic overlay video file to the overlay component 116 of the social networking system 106 to be combined with the video, where the dynamic overlay video file is transmitted separately from the video.

To generate the dynamic overlay video file, the computing device 104(1) may rasterize the dynamic overlay to a sequence of red green blue alpha (RGBA) bitmaps. In some examples, the computing device 104(1) may rasterize the dynamic overlay in response to receiving a user input to send and/or share the video as edited as described in the operation 210 of FIG. 2. For instance, the computing device 104(1) may convert individual components of a dynamic overlay from a vector graphics format to rasterized images, thus forming RGBA bitmap frames of the individual components for the duration of the video. The computing device 104(1) may resize the RGBA bitmaps to match the resolution of the video (e.g., width×height of the video). In some cases, the RGBA bitmaps match a frame rate of the video, but examples are considered in which the frame rate of the RGBA bitmaps is higher or lower than the frame rate of the video.

For example, an RGBA bitmap 302 includes a component 304(1), a component 304(2), and a component 304(3) (collectively "components 304"). Although not shown in color, each of the components 304 may include a variety of colors represented in the RGBA bitmap 302. In examples, the RGBA bitmap 302 is one of multiple RGBA bitmaps generated for a dynamic overlay video file. Individual ones of the RGBA bitmaps may vary, one to another, to represent an animation, motion, color change, and the like for the components 304 included in the dynamic overlay and for the duration of the video (or a portion of the video). In some examples, the RGBA bitmap 302 may omit color information in the frame that is unrelated to a specific component of the dynamic overlay. For instance, a background 306 (indicated by a checkered pattern) may correspond to a portion of the RGBA bitmap 302 that is unaltered by the components of the dynamic overlay. As a result, the dynamic overlay may be at least partially transparent when applied to a frame of the video, such that the frame of the video is visible when viewed on a client computing device.

After generating the RGBA bitmap 302, the computing device 104(1) may separate the red, green, and blue channels from the alpha channel of the RGBA bitmap 302. The computing device 104(1) may then stack the red, green, and blue channels horizontally (or vertically) with the alpha channel in a frame 308. In a horizontally-stacked orientation, the resulting frame 308 may have a resolution corresponding to $2W_1 \times H$, where the client device 104(1) may select a padded width $W_1$ greater than or equal to the width of the video W. In some cases, the computing device 104(1) may generate the frame 308 to have a width $W_1$ that is a multiple of 16 pixels to streamline H.264 encoder pixel alignment, although examples of different widths and encoders are also considered. The frame 308 includes a component representation 310(1) corresponding to the red, green, and blue channels of the component 304(1); a component representation 310(2) corresponding to the red, green, and blue channels of the component 304(2); and a component representation 310(3) corresponding to the red, green, and blue channels of the component 304(3). The frame 308 includes a component representation 312(1) corresponding to the alpha channel of the component 304(1), a component representation 312(2) corresponding to the alpha channel of the component 304(2), and a component representation 312(3) corresponding to the alpha channel of the component 304(3).

In some examples, the computing device 104(1) converts the color channel and the alpha channel in the frame 308 into luma components (Y) and chrominance components of a blue projection (U) and a red projection (V), forming a YUV frame. The computing device 104(1) may then encode the sequence of YUV frames that depict the dynamic overlay (including the frame 308 converted to YUV) into a dynamic overlay video file, such as a H.264 MP4 video file. By using a YUV frame to transmit the dynamic overlay as a dynamic overlay video file, the computing device 104(1) reduces the bandwidth required for chrominance components of the dynamic overlay to be transmitted. Once transmitted, the overlay component 116 may utilize an FFmpeg filter to combine the dynamic overlay video file with the video received from the computing device 104(1).

Figure 5:
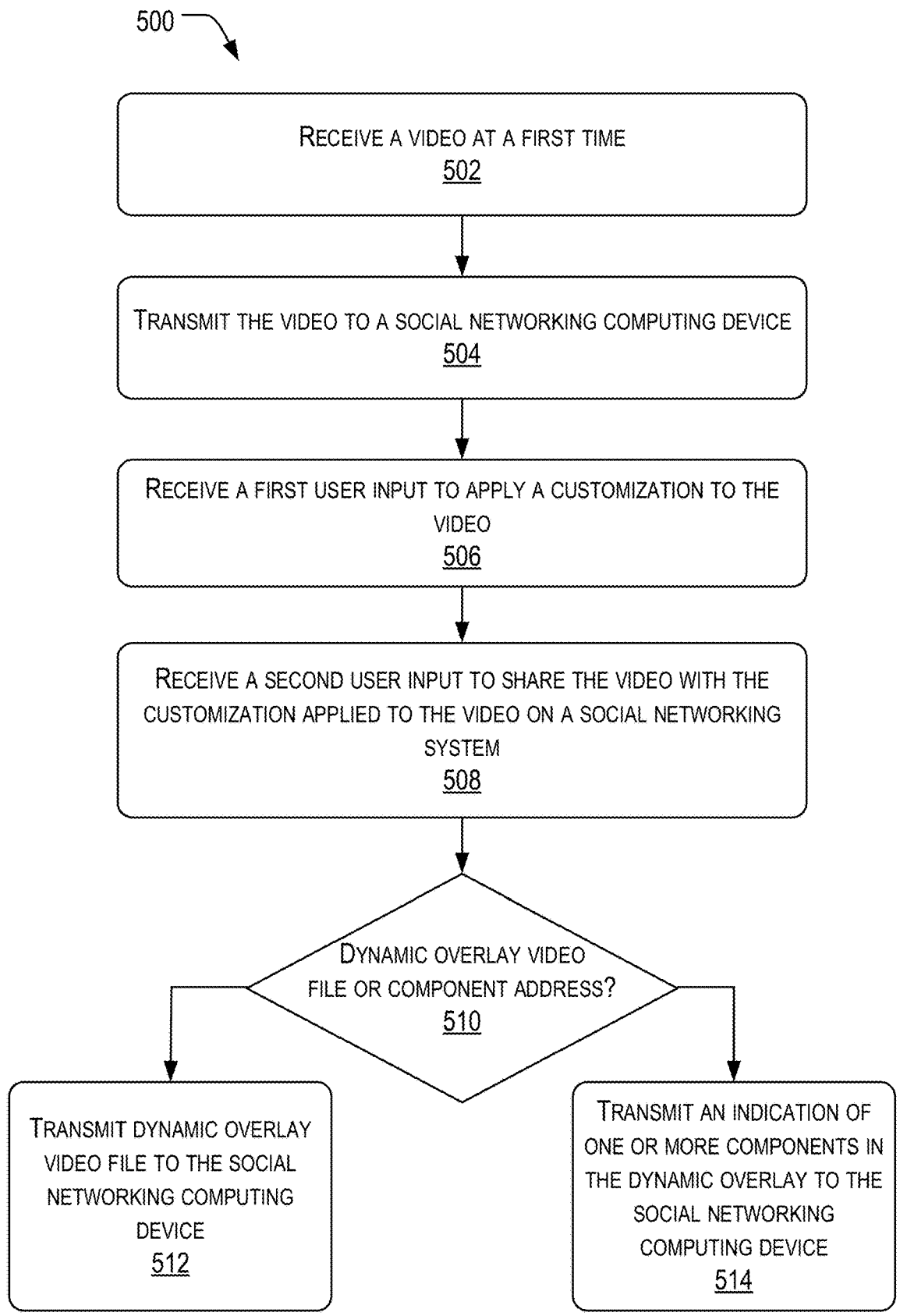
FIG. 5 illustrates a flowchart outlining an example method to transmit a dynamic overlay video file or a component address to a social networking computing device using the techniques described herein.

FIGS. 4 and 5 illustrate example processes for generating and sharing dynamic overlay video files on a social networking system using the techniques described herein. Various methods are described with reference to the example systems of FIGS. 1 and 2, and/or the example frames of FIG. 3 for convenience and ease of understanding. However, the methods described are not limited to being performed using the systems of FIG. 1, 2, or 6 and/or the example frames of FIG. 3, and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some examples, one or more operations of the methods may be omitted entirely. Moreover, the methods described herein can be combined in whole or in part with one another, other methods.

FIG. 4 illustrates a flowchart outlining an example method 400 to generate and share a video having a dynamic overlay using the techniques described herein.

An operation 402 includes receiving, by a server computing device at a first time from a first client device, a first video. For instance, the user 102(1) captures the first video using a camera of the computing device 104(1). In some examples, the user 102(1) may capture the first video using a social network application installed on the computing device 104(1), where the social network application accesses the camera of the computing device 104(1). The computing device 104(1) may, in some cases, begin transmitting the first video to the content sharing component 112 upon cessation of the video capture using the social network application by the user 102(1), and/or as the video is being captured.

An operation 404 includes receiving, by the server computing device at a second time after the first time and from the first client device, a customization (e.g., a dynamic overlay) to be applied to the first video. As discussed above, a dynamic overlay may include customizations that the user 102(1) desires to apply to the first video to share with other users 102(2)-102(n) on the social networking system 106. The customizations may include one or more filters that may impart an aesthetic on the video by varying characteristics such as saturation, brightness, contrast, sharpening, softening, and so forth by a predetermined amount. Alternatively or additionally, a filter may include an augmented reality effect that enhances one or more objects depicted in the video using computer-generated perceptual information. In some examples, the customizations may include one or more animated objects (e.g., animated GIFs), moving objects, stickers, or text overlays, to name a few examples. The dynamic overlay may comprise a dynamic overlay video file generated by the computing device 104(1), and/or an indication of one or more components to be included in the dynamic overlay video file, where the components are stored at the social networking system 106.

An operation 406 includes generating, by the server computing device, a second video by applying the customization (e.g., the dynamic overlay) to the first video. As mentioned above, the computing device 104(1) may transmit the first video and the dynamic overlay separately, at different times from one another, to the content sharing component 112. To ensure that the correct dynamic overlay is applied to the appropriate video, the first video may include a first identification tag (e.g., included in video metadata) and the dynamic overlay may also include a second identification tag (e.g., also included in metadata) that matches or is otherwise associated with the first identification tag. The overlay component 116 may determine that the first identification tag included with the first video matches the second identification tag included in the dynamic overlay prior to generating the second video. In some examples, the overlay component 116 combines the dynamic overlay with the first video using an FFmpeg filter.

An operation 408 includes providing, by the server computing device, the second video to a second client device. For example, the content sharing component 112 may deliver the second video to an inbox of the second user account associated with the user 102(2) as a direct message from the first user account of the user 102(1). In some cases, the content sharing component 112 may deliver the second video to inboxes of user accounts associated with multiple other users 102(2)-102(n) as direct messages. Alternatively or additionally, the content sharing component 112 may provide the second video to the other users 102(2)-102(n) as feed media, such that the content item appears in a feed of content posts that the other users 102(2)-102(n) follow on the social networking system 106. Further, in some cases, the content sharing component 112 may provide the second video to the other users 102(2)-102(n) as an ephemeral content item that is viewable for a limited duration.

FIG. 5 illustrates a flowchart outlining an example method 500 to transmit a dynamic overlay video file or a component address to a social networking computing device using the techniques described herein.

An operation 502 includes receiving a video at a first time. In examples, the user 102(1) may initiate video capture with the computing device 104(1) using a social network application installed on the computing device 104(1) that controls a camera of the computing device.

An operation 504 includes transmitting the video to a social networking computing device. In some cases, the client computing device may begin transmitting the video after the user 102(1) has concluded capture of the video. Examples are also considered in which the client computing device transmits the video while the user 102(1) is still in the process of capturing the video.

An operation 506 includes receiving a first user input to apply a customization (e.g., a dynamic overlay) to the video. In some examples, the user 102(1) may edit the video to include a dynamic overlay having one or more customizations such as an animated object, a moving object, and/or a filter, as described herein. As described above, the client computing device may transmit the video to the social networking computing device while the user 102(1) is making the edits to customize the video. Therefore, the client computing device may transmit the video without the edits to the social networking computing device, and the social networking computing device receives the video unedited while the user applies edits to the video on the client computing device.

An operation 508 includes receiving a second user input to share the video with the customization (e.g. the dynamic overlay) applied to the video on a social networking system. The user input to share the video may indicate a conclusion of the video edits to customize the video. Responsive to receiving the user input to share the video, the client computing device may transmit the dynamic overlay to the social networking computing device.

An operation 510 includes determining whether the dynamic overlay comprises a dynamic overlay video file or a component address for a component included in the dynamic overlay. For example, the computing device 104(1) may generate a dynamic overlay video file comprising multiple YUV frames. At least some of the YUV frames may be at least partially transparent, such that a portion of a frame of the video is visible when the dynamic overlay is applied to the video. Alternatively or additionally, the dynamic overlay may comprise an indication of one or more components to be included in the dynamic overlay, where the components are stored at the component address by the social networking system 106.

Responsive to determining that the dynamic overlay comprises a dynamic overlay video file, the method 500 proceeds to an operation 512, in which the dynamic overlay video file is transmitted to the social networking computing device. In some examples, the computing device 104(1) encodes the dynamic overlay video file in an AVC compression standard format prior to transmitting the dynamic overlay video file. The overlay component 116 may decode the dynamic overlay video file from the AVC compression standard format and combine the decoded dynamic overlay video file with the video using an FFmpeg filter, for instance.

Responsive to determining that the dynamic overlay comprises a component address, the method 500 proceeds to an operation 514, in which an indication of one or more components in the dynamic overlay is transmitted to the social networking computing device. As noted above, the social networking system 106 may store components that may be incorporated into dynamic overlays. The computing device 104(1) may transmit an indication of a component to be included in a dynamic overlay, where the indication may include information such as an address of a storage location of the component at the social networking system 106, a location at which the component is to be displayed in the dynamic overlay, a size at which the component is to be displayed in the dynamic overlay, a duration that the component is to be displayed in the dynamic overlay, and the like.

Example System and Device

Figure 6:
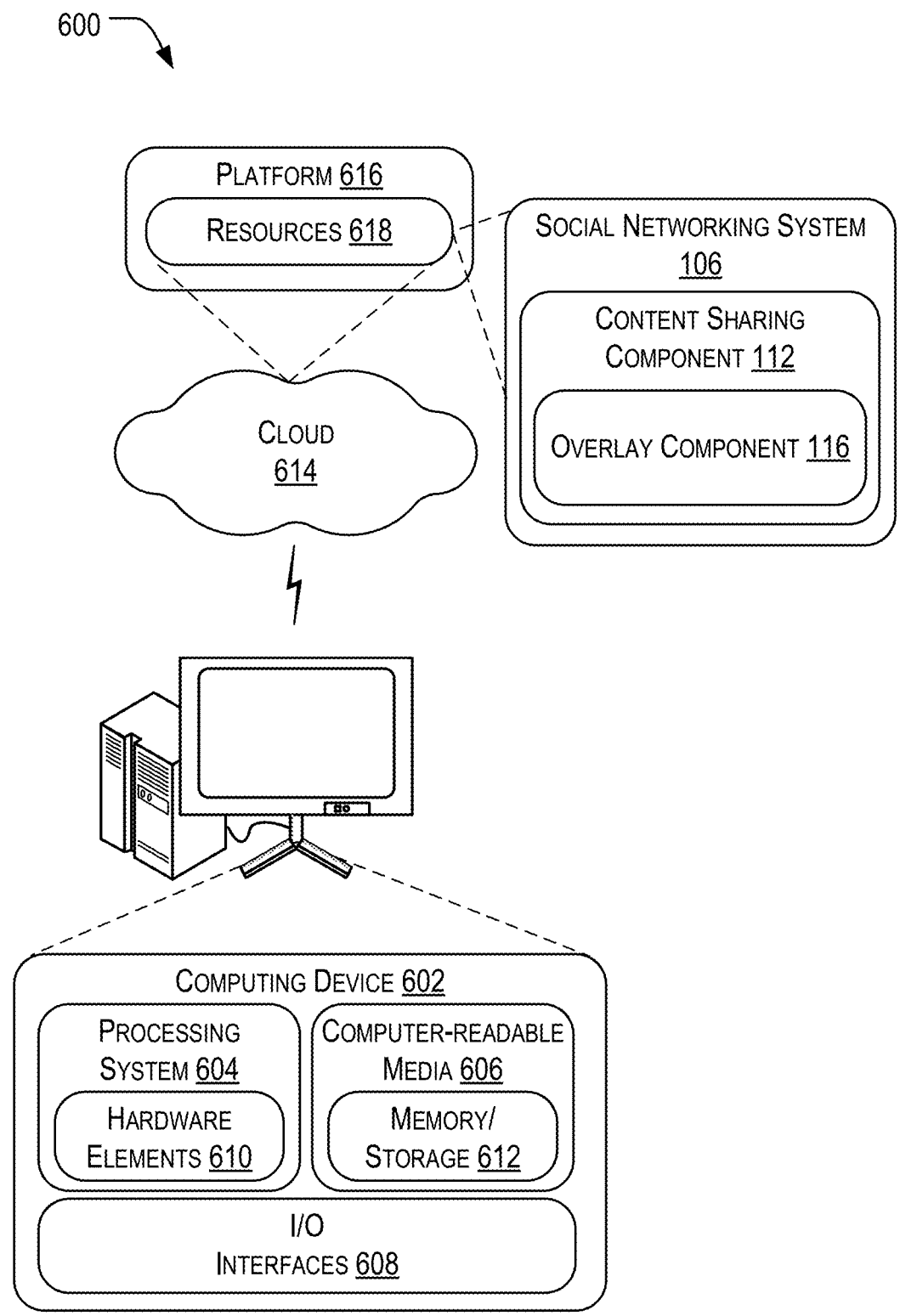
FIG. 6 is an example system and device that is usable to implement the techniques described herein.

FIG. 6 illustrates an example system generally at 600 that includes an example computing device 602 that is representative of one or more computing systems and/or devices that may implement the various techniques described herein. This is illustrated through inclusion of the content sharing component 112 and the overlay component 116. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage component 612. The memory/storage component 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 602. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 602, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 610 and computer-readable media 606 are representative of modules, programmable device logic and/or device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also be scalable to provide a corresponding level of scale to encountered demand for the resources 618 that are implemented via the platform 616. Accordingly, in an interconnected device example, implementation of functionality described herein may be distributed throughout multiple devices of the system 600. For example, the functionality may be implemented in part on the computing device 602 as well as via the platform 616 which may represent a cloud computing environment, such as the cloud 614.

The example systems and methods of the present disclosure overcome various deficiencies of known prior art devices. Other examples of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, by a server computing device at a first time from a first client device, a beginning transmission of a first video;
receiving, by the server computing device at a second time after the first time and from the first client device, a beginning transmission of a dynamic overlay to be applied to the first video, wherein the beginning transmission of the first video is received before the beginning transmission of the dynamic overlay;
generating, by the server computing device, a second video by applying the dynamic overlay to the first video, wherein the dynamic overlay is received separately from the first video, and the dynamic overlay is received in response to an indication from the first client device that the dynamic overlay is to be applied to the first video; and
providing, by the server computing device, the second video to a second client device.

2. The method of claim 1, wherein the dynamic overlay comprises one or more of:
an animated object;
a moving object; or
a filter that alters a characteristic of the first video.

3. The method of claim 1, wherein the dynamic overlay is at least partially transparent, such that when applied to a frame of the first video, at least a portion of the frame of the first video is visible.

4. The method of claim 1, wherein the first video has a first frame rate, and wherein the dynamic overlay has a second frame rate that is different from the first frame rate.

5. The method of claim 1, wherein the first video includes a first identification tag and the dynamic overlay includes a second identification tag that matches the first identification tag,
wherein generating the second video is responsive to receiving the second identification tag with the dynamic overlay and determining that the second identification tag matches the first identification tag included in the first video.

6. The method of claim 1, wherein the dynamic overlay is received in an advanced video coding (AVC) compression standard format, the method further comprising:
decoding the dynamic overlay from the AVC compression standard format, and
wherein generating the second video comprises applying the dynamic overlay as decoded to the first video.

7. The method of claim 1, wherein generating the second video comprises applying an FFmpeg filter to combine the dynamic overlay with the first video.

8. A client computing device comprising:
one or more processors; and
one or more computer-readable media storing instructions that, when executed by the one or more processors, cause the one or more processors to perform operations comprising:
receiving a video at a first time;
transmitting the video to a social networking computing device at a second time;
receiving a first user input to apply a dynamic overlay to the video;
receiving a second user input to share the video with the dynamic overlay applied to the video on a social networking system at a third time, wherein the first user input and the second user input are received from a same user account; and
transmitting, at a fourth time, in response to the second user input, at least one of the dynamic overlay or an indication of one or more components included in the dynamic overlay to the social networking computing device, wherein the second time begins before the fourth time, wherein the at least one of the dynamic overlay or an indication of one or more components included in the dynamic overlay is transmitted to the social networking computing device separately from the video, and the at least one of the dynamic overlay or an indication of one or more components included in the dynamic overlay is transmitted in response to receiving an indication that the dynamic overlay is applied to the video.

9. The client computing device of claim 8, wherein transmitting comprises transmitting the dynamic overlay, and wherein the dynamic overlay comprises one or more of:
an animated object;
a moving object; or
a filter that alters a characteristic of the first video.

10. The client computing device of claim 8, wherein transmitting comprises transmitting the indication of the one or more components included in the dynamic overlay, the indication comprising an address of the one or more components stored at the social networking computing device.

11. The client computing device of claim 8, the operations further comprising:
rasterizing the one or more components included in the dynamic overlay to a red green blue alpha (RGBA) bitmap;
separating the RGBA bitmap into at least a color channel and an alpha channel;
converting the color channel and the alpha channel into a luma, a blue projection, and a red projection (YUV) frame; and
generating a dynamic overlay video file that includes at least the YUV frame,
wherein transmitting the dynamic overlay comprises transmitting the dynamic overlay video file.

12. The client computing device of claim 11, the operations further comprising encoding the dynamic overlay video file in an advanced video coding (AVC) compression standard format,
wherein transmitting the dynamic overlay comprises transmitting the dynamic overlay video file in the AVC compression standard format.

13. The client computing device of claim 8, wherein the dynamic overlay is at least partially transparent, such that when applied to a frame of the video, at least a portion of the frame of the video is visible.

14. The client computing device of claim 8, wherein the video has a first frame rate, and wherein the dynamic overlay has a second frame rate that is different from the first frame rate.

15. The client computing device of claim 8, wherein the video includes a first identification tag and the dynamic overlay or the indication of one or more components included in the dynamic overlay includes a second identification tag that matches the first identification tag,
wherein transmitting the dynamic overlay or the indication further comprises transmitting the second identification tag.

16. A method comprising:
receiving, at a client computing device, a video at a first time;
transmitting the video to a social networking computing device at a second time;
receiving, at the client computing device, a first user input to apply a dynamic overlay to the video;
receiving, at the client computing device, a second user input to share the video with the dynamic overlay applied to the video on a social networking system at a third time, wherein the first user input and the second user input are received from the same user account; and
transmitting, at a fourth time, in response to the second user input and by the client computing device, the dynamic overlay or an indication of one or more components included in the dynamic overlay to the social networking computing device, wherein the second time begins before the fourth time, the dynamic overlay is transmitted separately from the video, and the dynamic overlay is transmitted in response to an indication from the user account that the dynamic overlay is applied to the video.

17. The method of claim 16, further comprising:
rasterizing the one or more components included in the dynamic overlay to a red green blue alpha (RGBA) bitmap;
separating the RGBA bitmap into at least a color channel and an alpha channel;
converting the color channel and the alpha channel into a luma, a blue projection, and a red projection (YUV) frame; and
generating a dynamic overlay video file that includes at least the YUV frame,
wherein transmitting the dynamic overlay comprises transmitting the dynamic overlay video file.

18. The method of claim 17, further comprising encoding the dynamic overlay video file in an advanced video coding (AVC) compression standard format,
wherein transmitting the dynamic overlay comprises transmitting the dynamic overlay video file in the AVC compression standard format.

19. The method of claim 16, wherein the dynamic overlay is at least partially transparent, such that when applied to a frame of the video, at least a portion of the frame of the video is visible.

20. The method of claim 16, wherein the video includes a first identification tag and the dynamic overlay or the indication of one or more components included in the dynamic overlay includes a second identification tag that matches the first identification tag,
wherein transmitting the dynamic overlay or the indication further comprises transmitting the second identification tag.

* * * * *